(12) United States Patent
Zhang (10) Patent No.: US 11,645,357 B2
(45) Date of Patent: May 9, 2023

(54) CONVOLUTION OPERATION METHOD AND APPARATUS, COMPUTER DEVICE, AND COMPUTER-READABLE STORAGE MEDIUM

(71) Applicant: Hangzhou Hikvision Digital Technology Co., Ltd., Zhejiang (CN)

(72) Inventor: Yuan Zhang, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 386 days.

(21) Appl. No.: 16/649,306

(22) PCT Filed: Sep. 20, 2018

(86) PCT No.: PCT/CN2018/106600
§ 371 (c)(1),
(2) Date: Mar. 20, 2020

(87) PCT Pub. No.: WO2019/057097
PCT Pub. Date: Mar. 28, 2019

(65) Prior Publication Data
US 2020/0265306 A1 Aug. 20, 2020

(30) Foreign Application Priority Data
Sep. 22, 2017 (CN) .......................... 201710866060.5

(51) Int. Cl.
*G06N 20/10* (2019.01)
*G06F 7/36* (2006.01)
(Continued)

(52) U.S. Cl.
CPC .............. *G06F 17/153* (2013.01); *G06F 7/36* (2013.01); *G06F 18/213* (2023.01);
(Continued)

(58) Field of Classification Search
CPC ......... G06F 17/153; G06F 7/36; G06N 20/10; G06N 3/0454; G06N 3/063; G06N 3/08; G06K 9/6232; G06K 9/6261
See application file for complete search history.

(56) References Cited

U.S. PATENT DOCUMENTS 9,589,374 B1    3/2017  Gao et al.
10,952,613 B2 *  3/2021  Kim .................... A61B 5/7267
(Continued)

FOREIGN PATENT DOCUMENTS

CN      104809426 A    7/2015
CN      105260773 A    1/2016
(Continued)

OTHER PUBLICATIONS

Laina et al., Deeper Depth Prediction with Fully Convolutional Residual Networks, 2016 Fourth International Conference on 3D Vision, IEEE, 2016, p. 239-248.
(Continued)

*Primary Examiner* — Tsung Yin Tsai
(74) *Attorney, Agent, or Firm* — Bret E. Field; Bozicevic, Field & Francis LLP (57) ABSTRACT

Embodiments of the present application provide a method, an apparatus, a computer device for convolution operation and a computer readable storage medium. The method includes: obtaining input data of a network layer in a convolutional neural work; extracting each time a plurality of data points from the input data according to a preset step size; mapping the plurality of data points extracted each time to the same position at different depth levels of three-dimensional data to obtain rearranged data; and performing convolution operation on the rearranged data with a convolution kernel of a preset size to obtain a convolution result.
(Continued)

Through the present solution, the operation efficiency of the convolutional neural network can be improved.

10 Claims, 4 Drawing Sheets

(51) Int. Cl.
  *G06F 18/213* (2023.01)
  *G06F 17/15* (2006.01)
  *G06N 3/08* (2023.01)
  *G06F 18/21* (2023.01)

(52) U.S. Cl.
  CPC ........... *G06F 18/2163* (2023.01); *G06N 3/08* (2013.01); *G06N 20/10* (2019.01)

(56) References Cited

U.S. PATENT DOCUMENTS

| | | | |
|---|---|---|---|
| 2009/0034871 A1 | 2/2009 | Keshet et al. | |
| 2011/0222752 A1* | 9/2011 | Zhang | G06T 7/11 382/132 |
| 2011/0299752 A1 | 12/2011 | Sun | |
| 2016/0117587 A1 | 4/2016 | Yan et al. | |
| 2017/0262737 A1 | 9/2017 | Rabinovich et al. | |
| 2018/0181858 A1* | 6/2018 | Son | G06N 3/08 |
| 2019/0246904 A1* | 8/2019 | Kim | A61B 5/0042 |
| 2020/0110604 A1* | 4/2020 | Lovell | G06N 3/045 |
| 2020/0265306 A1* | 8/2020 | Zhang | G06F 7/36 |

FOREIGN PATENT DOCUMENTS

| | | |
|---|---|---|
| CN | 105320965 A | 2/2016 |
| CN | 105787488 A | 7/2016 |
| CN | 106845635 A | 6/2017 |
| CN | 106874955 A | 6/2017 |
| CN | 106898011 A | 6/2017 |
| CN | 106980896 A | 7/2017 |
| CN | 106991372 A | 7/2017 |
| CN | 107103277 A | 8/2017 |
| CN | 107145939 A | 9/2017 |
| WO | WO2016186811 A1 | 11/2016 |

OTHER PUBLICATIONS

Wang et al., Method on Human Activity Recognition Based on Convolutional Neural Networks, Computer Science, vol. 43, No. 11A, Nov. 2016, p. 56-87, and its English abstract, 4 pages.

* cited by examiner

CONVOLUTION OPERATION METHOD AND APPARATUS, COMPUTER DEVICE, AND COMPUTER-READABLE STORAGE MEDIUM

The present application claims the priority to a Chinese patent application No. 201710866060.5, filed with the China National Intellectual Property Administration on Sep. 22, 2017 and entitled "Convolution Operation Method And Apparatus, Computer Device, And Computer-Readable Storage Medium", which is incorporated herein by reference in its entirety.

TECHNICAL FIELD

The present application relates to the technical field of deep learning, and in particular to a method, an apparatus, a computer device for convolution operation and a computer readable storage medium.

BACKGROUND

Network layers in a Convolutional Neural Network (CNN) typically have input data of different sizes. Therefore, convolution kernels for convolution operation in the network layers may have different sizes. Sizes of convolution kernels have a direct influence on the design of a hardware platform corresponding to the CNN. For a CNN having convolution kernels of various sizes, a hardware platform complex in design is required to support the operation of the CNN. This results in a large overhead of hardware resources.

Regarding the above problem, in a corresponding convolution operation method, a large-sized convolution kernel in a network is replaced by two small-sized convolution kernels for convolution operation on input data. For example, two convolution kernels with a size of 3×3 are used to replace a convolution kernel with a size of 5×5 for convolution operation on the input data. However, for a network layer, two convolution kernels are now required to complete the convolution operation that can be done by a single convolution kernel. Therefore, this method increases the burden of convolution operation and reduces the efficiency of convolution operation.

SUMMARY

The purpose of the embodiments of the present application is to provide a method, an apparatus, a computer device for convolution operation and a computer readable storage medium, so as to improve the operation efficiency of the convolutional neural network. The following aspects are provided.

In the first aspect, an embodiment of the present application provides a method for convolution operation, including:

obtaining input data of a network layer in a convolutional neural work;

extracting each time a plurality of data points from the input data according to a preset step size;

mapping the plurality of data points extracted each time to the same position at different depth levels of three-dimensional data to obtain rearranged data; and performing convolution operation on the rearranged data with a convolution kernel of a preset size to obtain a convolution result.

In the second aspect, an embodiment of the present application provides an apparatus for convolution operation, including:

an obtaining module, configure for obtaining input data of a network layer in a convolutional neural work;

an extraction module, configured for extracting each time a plurality of data points from the input data according to a preset step size;

a mapping module, configured for mapping the plurality of data points extracted each time to the same position at different depth levels of three-dimensional data to obtain rearranged data; and an operation module, configured for performing convolution operation on the rearranged data with a convolution kernel of a preset size to obtain a convolution result.

In the third aspect, an embodiment of the present application provides a computer readable storage medium having executable codes stored thereon which, when executed, perform the method for convolution operation according to the embodiment in the first aspect.

In the fourth aspect, an embodiment of the present application provides an application program which, when executed, performs the method for convolution operation according to the embodiment in the first aspect.

In the fifth aspect, an embodiment of the present application provides a computer device, including:

a computer readable storage medium configured for storing executable codes; and a processor configured for executing the executable code stored in the computer readable storage medium to perform the method for convolution operation according to the embodiment in the first aspect.

In view of above, in above embodiments, a plurality of data points are extracted each time from obtained input data of a network layer in a convolutional neural network according to a preset step size; the plurality of data points extracted each time are mapped to the same position at different depth levels in three-dimensional data to obtain rearranged data; and a convolution kernel of a preset size is used to perform convolution operation on the rearranged data to obtain a convolution result. Since a plurality of data points are extracted from the input data of the network layer and mapped, the input data is expanded in the depth direction, and the size at each depth level is reduced. As the size of the input data decreases, a smaller convolution kernel can be used to perform convolution operation on the input data. Through this method, the input data of each network layer is processed in such a way that convolution operation can be performed on all the obtained rearranged data by using the same convolution kernel of a preset size. Therefore, the overhead of hardware resources can be reduced. Moreover, the same convolution kernel of a smaller size is used to perform convolution operation on all the network layers. Operation efficiency of the convolutional neural network is thus improved.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to make objectives, technical solutions and advantages of the present application more apparent, the present application will be described in detail with reference to the accompanying drawings and by way of examples. Obviously, the embodiments described are only some of the embodiments of the present application instead of all of them. All other embodiments obtained by those of ordinary skills in the art based on the embodiments herein without any creative efforts are within the scope of the present application.

The present application will be described in detail with reference to embodiments.

In order to improve the operation efficiency of a convolutional neural network, embodiments of the present application provide a method, an apparatus, a computer device for convolution operation, and a computer-readable storage medium.

The method for convolution operation according to the embodiment of the present application will be first introduced below.

The method for convolution operation according to the embodiment of the present application can be implemented on a computer device capable of convolution operation, for example, an image processor, or a camera capable of image processing. The entity on which the method is implemented includes at least a core chip capable of data processing. The method for convolution operation according to the embodiment of the present application can be embodied, within an entity, in software, hardware circuit, a logic circuit or a combination thereof.

Figure 1:
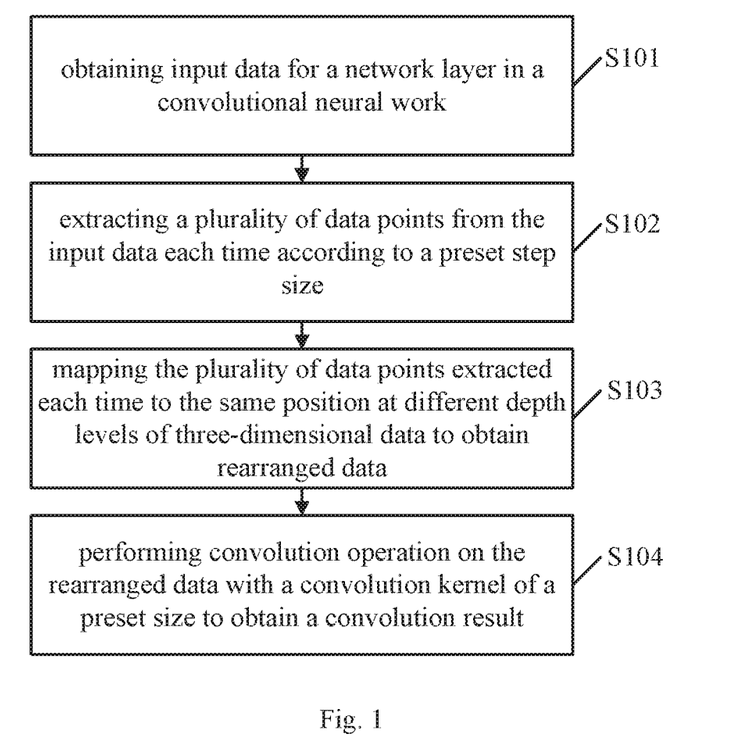
FIG. 1 is a schematic flowchart of a method for convolution operation according to an embodiment of the present application.

As shown in FIG. 1, the method for convolution operation according to the embodiment of the present application may include following steps.

S101: obtaining input data for a network layer in a convolutional neural work.

The input data for each of network layers in a convolutional neural network is three-dimensional data, having a size that can be represented as W×H×I, wherein I is the depth of the input data, and W×H is the data size at each depth level. That is, W×H represents the width and height of data at each depth level. Sizes of input data for network layers in the convolutional neural network are different, especially in the data size at each depth level. To improve operation speed, for large-sized input data, a convolution kernel of a large size may be selected for convolution operation, and for a small-sized input data, a convolution kernel of a small size may be selected for convolution operation. However, this requires a complex hardware platform that allows multiple convolution kernels to respectively perform convolution operation on the input data of different network layers. This would affect operation efficiency of the convolutional neural network.

In light of the impact of input data on choice of a convolution kernel, reduction of data size at each depth level of the input data is contemplated. In this way, a convolution kernel of a smaller size may be selected to perform convolution operation on the input data. As such, a single convolution kernel of a small size may be used for different network layers. This not only guarantees the operation speed of the convolution operation, but also improves the operation efficiency of the convolutional neural network. Therefore, in the embodiment of the present application, through above processing on input data, the purpose of improving operation efficiency of convolutional neural network is achieved.

S102: extracting a plurality of data points from the input data each time according to a preset step size.

In order to reduce the size of input data at each depth level for a network layer without changing original volume of the input data, increasing the depth of the input data is contemplated. For example, a plurality of data points in the input data can be mapped to the same position at different depth levels. In this way, the size of input data at each depth level may be reduced without changing original volume of the input data. Before mapping, data points that are to be mapped to the same position at different depth levels have to be determined. In order not to affect the result of convolution operation, adjacent data may be mapped. Optionally, S102 may specifically include:

extracting, from each depth level of the input data, a plurality of data points each time according to the preset step size.

The preset step size may be taken as a preset rule for extracting a plurality of data points. For example, if the preset step size is 2×2, then four data points are extracted each time from each depth level according to a rule of 2×2. In the process of extracting a plurality of data points, a plurality of data points that meet the preset step size may be extracted from all depth levels at once. For example, for an input data depth of 256 and a preset step size of 2×2, 2×2×256 data points are extracted at once. Alternatively, a plurality of data points that meet the preset step size may be extracted from one depth level at a time. For example, for a preset step size of 2×2, 2×2 data points are extracted at a time. In addition, a plurality of data points that meet the preset step size may be extracted from multiple depth levels at a time. For example, for a preset step size of 2×2, data points at 10 depth levels can be extracted at a time, i.e., 2×2×10 data points are extracted at a time.

S103: mapping the plurality of data points extracted each time to the same position at different depth levels of three-dimensional data to obtain rearranged data.

After being extracted, the plurality of data points may be mapped, so as to be arranged to the same position at different depth levels of the three-dimensional data. For example, four data points a, b, c, and d as extracted through the above steps may be arranged to the same position at four consecutive depth levels in any order. The order may be any one of [a→b→c→d], [a→b→d→c], [a→c→b→d], [a→c→d→b], [a→d→b→c], [a→d→c→b], [b→a→c→d], [b→a→d→c], [b→d→a→c], [b→d→c→a], [b→c→a→d], [b→c→d→a], [c→a→b→d], [c→a→d→b], [c→b→a→d], [c→b→d→a], [c→d→a→b], [c→d→b a], [d→a→b→c], [d→a→c→b],

[d→b→a→c], [d→b→c→a], [d→c→a→b], [d→c→b→a], wherein arrows indicate the order in which the four data points are arranged.

Optionally, S103 may specifically include:

mapping the plurality of data points extracted each time from each depth level of the input data to the same position at different depth levels in the three-dimensional data to obtain a plurality of data to be merged; and arranging a plurality of to-be-merged data in the depth direction to obtain the rearranged data.

If the plurality of data points that meet the preset step size are extracted, in each time of extraction, from a single depth level of the input data, the plurality of extracted data points may be arranged directly to the same position at different depth levels of a newly established three-dimensional data according to the above mapping method.

Optionally, S103 may specifically include:

arranging the plurality of data points extracted each time; and storing the plurality of data points extracted each time, in an order as they are arranged, to the same position at different depth levels in the three-dimensional data, to obtain the rearranged data.

If a plurality of data points that meet the preset step size are extracted from multiple depth levels or all depth levels of the input data, data points extracted from each depth level may be arranged first, and then all the extracted data points are arranged to the same position at different depth levels of a newly established three-dimensional data in sequence of their depth. For example, if the size of the input data is 26×26×10 and data points are extracted according to a preset step size of 2×2, the size of the rearranged data is 13×13×40. Alternatively, if the extraction is performed every other line/column, the size of the rearranged data is 25×25×40.

Alternatively, for each of depth levels of input data, data points therein meeting the preset step size may be extracted for several times. Data points extracted each time from each depth level are mapped to the same position at different depth levels in a newly established three-dimensional data to obtain a plurality of data to be merged. The plurality of data to be merged is arranged in the depth direction to obtain rearranged data. For example, if the size of the input data is 26×26×10 and data points are extracted from each depth level according to a preset step size of 2×2, data to be merged with a size of 13×13×4 corresponding to each depth level is obtained. The data to be merged corresponding to 10 depth levels is then merged to obtain rearranged data with the size of 13×13×40. The data may be merged, for example, arranging the data to be merged corresponding to each depth level, and the rearranged data is obtained through arrangement. For the above input data with a depth of 10, there can be 10!=3628800 kinds of arrangement manner, any one of these arrangement manners may be selected as the manner in which the data to be merged corresponding to each depth level are merged.

S104: performing convolution operation on the rearranged data with a convolution kernel of a preset size to obtain a convolution result.

Due to the processing on the input data in the above steps, the data size at each depth level of the input data is reduced. Thus, a convolution kernel of a preset size can be used to perform convolution operation on the rearranged data. The convolution kernel of the preset size may be a convolution kernel of a small size, such as a convolution kernel with a size of 3×3 or smaller. In addition, by performing the above steps on the input data of each network layer, a convolution kernel of the same size can be used to perform all the convolution operation. Therefore, for a convolutional neural network, a single convolution kernel of a small size can be used to perform convolution operation on the input data for all network layers. Therefore, the convolution operation can be implemented by using a simple hardware platform. This improves operation efficiency of the convolutional neural network.

With the present embodiment, a plurality of data points are extracted each time from obtained input data of a network layer in a convolutional neural network according to a preset step size; the plurality of data points extracted each time are mapped to the same position at different depth levels in three-dimensional data to obtain rearranged data; and a convolution kernel of a preset size is used to perform convolution operation on the rearranged data to obtain a convolution result. Since a plurality of data points are extracted from the input data of the network layer and mapped, the input data is expanded in the depth direction, and the size at each depth level is reduced. As the size of the input data decreases, a smaller convolution kernel can be used to perform convolution operation on the input data. Through this method, the input data of each network layer is processed in such a way that convolution operation can be performed on all the obtained rearranged data by using the same convolution kernel of a preset size. Therefore, the overhead of hardware resources can be reduced. Moreover, the same convolution kernel of a smaller size is used to perform convolution operation on all the network layers. Operation efficiency of the convolutional neural network is thus improved.

Figure 2:
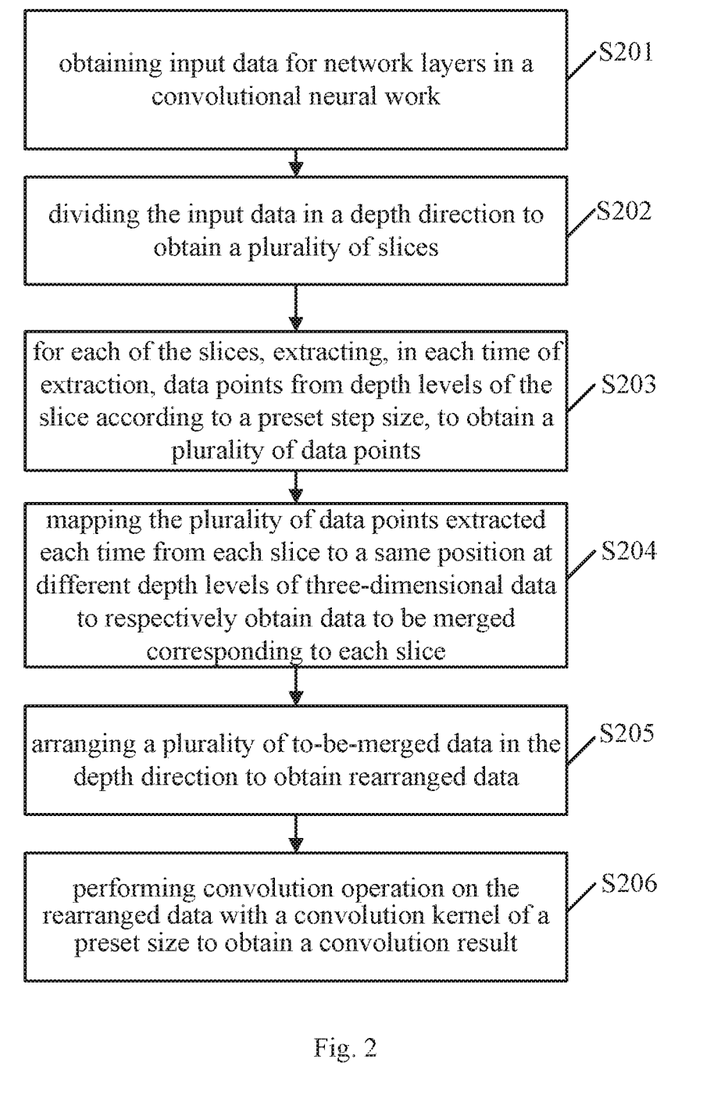
FIG. 2 is a schematic flowchart of a method for convolution operation according to another embodiment of the present application.

Further to the embodiment shown in FIG. 1, an embodiment of the present application provides another method for convolution operation. As shown in FIG. 2, the method includes following steps.

S201: obtaining input data for network layers in a convolutional neural work.

S202: dividing the input data in a depth direction to obtain a plurality of slices.

S203: for each of the slices, extracting, in each time of extraction, data points from depth levels of the slice according to a preset step size, to obtain a plurality of data points.

In the process of extracting data points, if data points at all depth levels that meet the preset step size are extracted in one extraction, the calculation burden for extraction and mapping may be too large. As a result, operations at various depth levels cannot be performed in parallel. This may reduce operation speed. Therefore the input data may be divided in the depth direction to obtain a plurality of slices. In the input data division, a slice may contain one depth level, or a plurality of depth levels may be contained in one slice. After division, extraction of data points in slices may be performed in parallel. Operation speed is thus improved.

S204: mapping the plurality of data points extracted each time from each slice to a same position at different depth levels of three-dimensional data to respectively obtain data to be merged corresponding to each slice.

For each slice, after extracting a plurality of data points each time, the plurality of data points may be mapped, so as be arranged to the same position at different depth levels in the three-dimensional data. The mapping process is the same as that in the embodiment shown in FIG. 1, which is not repeated here.

If data points that meet the preset step size are extracted from one depth level at a time, the data points extracted may be directly arranged to the same position at different depth levels. If data points that meet the preset step size are extracted from multiple depth levels at a time, data points extracted from each depth level may be arranged first, and then the plurality of data points are arranged to the same position at different depth levels according to an order along depth.

S205: arranging a plurality of to-be-merged data in the depth direction to obtain rearranged data.

The plurality of data points extracted each time from each slice are mapped to the same position at different depth levels in the three-dimensional data to obtain a plurality of data to be merged, and then the plurality of to-be-merged data are arranged in the depth direction to obtain rearranged data. For example, input data of a size of 26×26×10 is divided in the depth direction into three slices with sizes of 26×26×1, 26×26×3 and 26×26×6. Data points are extracted from each slice according to a preset step size of 2×2, such that to-be-merged data with sizes of 13×13×4, 13×13×12 and 13×13×24 are obtained. The to-be-merged data is then merged to obtain the rearranged data with a size of 13×13×40. The merging may be performed by arranging to-be-merged data from slices in any way to obtain rearranged data. For the above input data, there can be 3!=6 kinds of arrangements. In any of these arrangements, to-be-merged data from slices can be merged.

S206: performing convolution operation on the rearranged data with a convolution kernel of a preset size to obtain a convolution result.

In the present embodiment, the input data is divided in the depth direction into a plurality of slices; data points are extracted each time from each slice according to a preset step size; data points extracted are mapped to the same position at different depth levels in the three-dimensional data and are then arranged by merging. A convolution kernel of a preset size is used to perform convolution operation on the rearranged data to obtain a convolution result. After dividing the input data, the extraction of a plurality of data points from each slice may be performed in parallel, which can increase the operation speed. In addition, since a plurality of data points are extracted from each slice and mapped, each slice is expanded in the depth direction, and the size at each depth level is reduced, and thus a smaller convolution kernel can be used to perform convolution operation on the input data. Through this method, the input data of each network layer is processed in such a manner that convolution operation can be performed on all the rearranged data with the same convolution kernel of a preset size. Therefore, the overhead of hardware resources can be reduced, and for each network layer, the same convolution kernel of a smaller size is used to perform convolution operation, which can improve the operation efficiency of the convolutional neural network.

For ease of understanding, the method for convolution operation according to the embodiment of the present application is introduced below with reference to a specific example.

Figure 3:
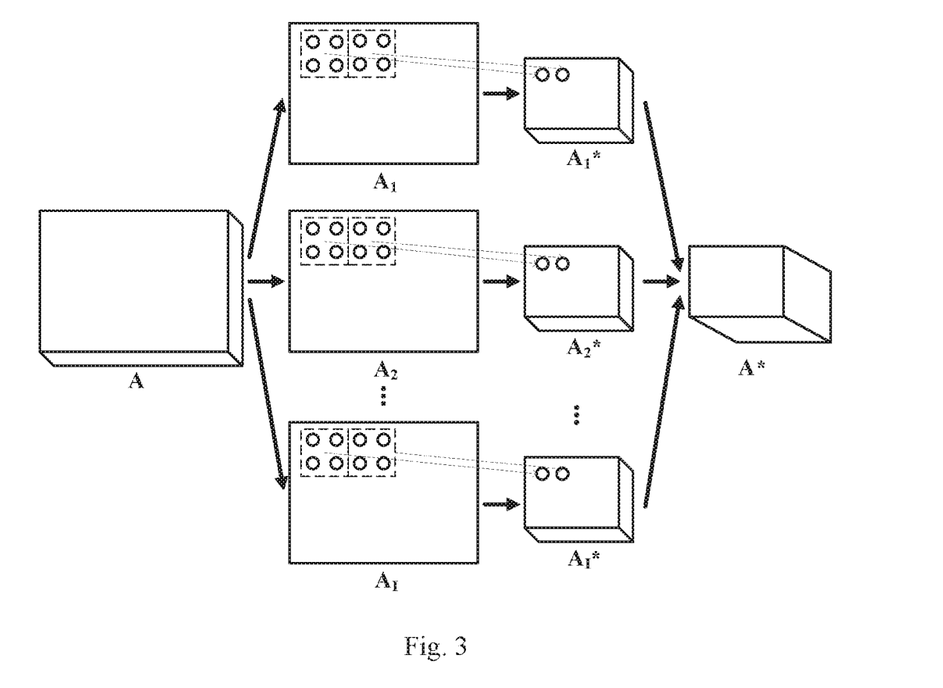
FIG. 3 is a schematic diagram of rearranging the input data according to an embodiment of the present application.

In the first step, for a network layer the convolution kernel of which is to be replaced with a smaller-sized convolution kernel, the input data of this network layer is denoted as A, wherein A is three-dimensional data with a size of W×H×I.

In the second step, A is divided into I slices in the depth direction, and each slice is denoted as $A_i$, as shown in FIG. 3, wherein i∈[1, I].

In the third step, 4 data points $a_j$ are extracted from Ai each time according to a step size of 2×2, as shown by dashed boxes in $A_i$ of FIG. 3, wherein j∈[1,4].

In the fourth step, the extracted data points are mapped to the same position of three-dimensional data $A_i^*$, wherein the size of $A_i^*$ is W*×H*×4, and the arrangement order of the data points may be any one of 4!=24 kinds of arrangement orders.

In the fifth step, $A_i^*$ is merged in the depth direction to obtain rearranged data A*, wherein the size of A* is W*×H*×4I, and $A_i^*$ may be merged by being arranged in an order of any one of I! kinds of arrangement orders.

In the sixth step, based on the rearranged data A*, a convolution kernel of a preset size $K_r×K_r×I_r×O$ may be used to perform convolution operation to obtain a convolution result.

In the present solution, input data is divided in the depth direction into a plurality of slices; a plurality of data points are extracted each time from each slice according to a step size of 2×2; and the plurality of data points extracted each time are mapped to the same position at different depth levels in the three-dimensional data to obtain rearranged data by merging; and a convolution kernel of a preset size is used to perform convolution operation on the rearranged data to obtain a convolution result. In the process of dividing the input data, each depth level is divided into one slice. After division, extraction of a plurality of data points from each slice may be performed in parallel, which can increase the operation speed. In addition, since a plurality of data points are extracted from each slice and mapped, each slice is expanded in the depth direction, and the size at each depth level is reduced, and thus a smaller convolution kernel can be used to perform convolution operation on the input data. Through this method, the input data of each network layer is processed, and convolution operation can be performed on all the obtained rearranged data by using the same convolution kernel of a preset size. Therefore, the overhead of hardware resources can be reduced, and for each network layer, the same convolution kernel of a smaller size is used to perform convolution operation, which can improve the operation efficiency of the convolutional neural network.

Figure 4:
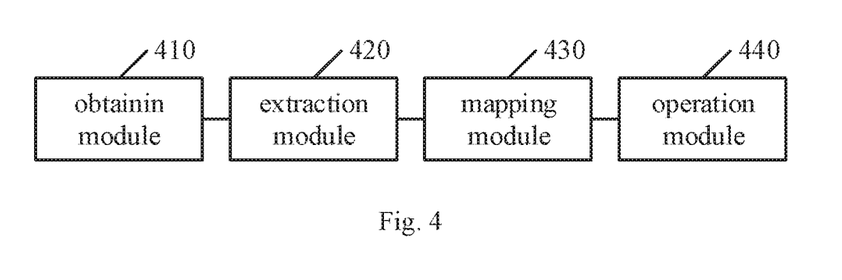
FIG. 4 is a schematic structural diagram of an apparatus for convolution operation according to an embodiment of the present application.

Corresponding to the above embodiment of the method for convolution operation, as shown in FIG. 4, an embodiment of the present application further provides an apparatus for convolution operation, which may include:

an obtaining module 410, configure for obtaining input data of a network layer in a convolutional neural work;

an extraction module 420, configured for extracting each time a plurality of data points from the input data according to a preset step size;

a mapping module 430, configured for mapping the plurality of data points extracted each time to the same position at different depth levels of three-dimensional data to obtain rearranged data; and an operation module 440, configured for performing convolution operation on the rearranged data with a convolution kernel of a preset size to obtain a convolution result.

With the present embodiment, a plurality of data points are extracted each time from obtained input data of a network layer in a convolutional neural network according to a preset step size; the plurality of data points extracted each time are mapped to the same position at different depth levels in three-dimensional data to obtain rearranged data; and a convolution kernel of a preset size is used to perform convolution operation on the rearranged data to obtain a convolution result. Since a plurality of data points are extracted from the input data of the network layer and mapped, the input data is expanded in the depth direction, and the size at each depth level is reduced. As the size of input data decreases, a smaller convolution kernel can be used to perform convolution operation on the input data. Through this method, the input data of each network layer is processed in such a way that convolution operation can be performed on all the obtained rearranged data by using the same convolution kernel of a preset size. Therefore, the overhead of hardware resources can be reduced. Moreover, the same convolution kernel of a smaller size is used to perform convolution operation on all the network layers. Operation efficiency of the convolutional neural network is thus improved.

Optionally, the extraction module 420 is specifically configured for:

extracting each time, from each depth level of the input data, a plurality of data points according to the preset step size respectively.

The mapping module 430 is specifically configured for:

mapping the plurality of data points extracted each time from depth levels of the input data to the same position at different depth levels in the three-dimensional data to obtain a plurality of data to be merged; and arranging a plurality of to-be-merged data in the depth direction to obtain the rearranged data.

Optionally the extraction module 420 is specifically configured for:

arranging the plurality of data points extracted each time; and storing the plurality of data points extracted each time, in an order as they are arranged, to the same position at different depth levels in the three-dimensional data to obtain the rearranged data.

The apparatus for convolution operation according to the present embodiment is an apparatus for applying the method for convolution operation according to the embodiment shown in FIG. 1. Therefore, all the embodiments of the above method for convolution operation are applicable to the apparatus for convolution operation, and both have the same or similar beneficial effects, details of which are not repeated here.

Figure 5:
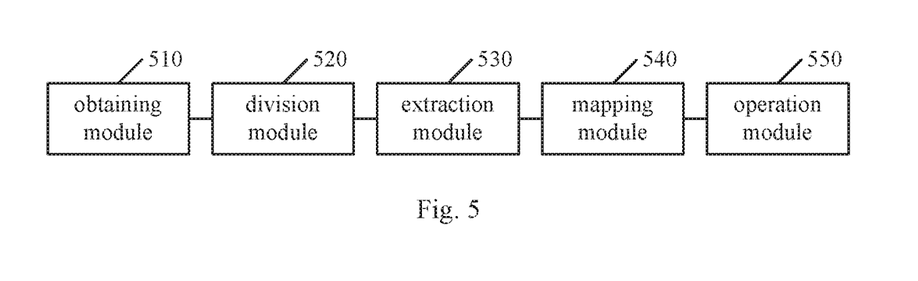
FIG. 5 is a schematic structural diagram of an apparatus for convolution operation according to another embodiment of the present application.

Based on the embodiment shown in FIG. 4, an embodiment of the present application further provides another apparatus for convolution operation, as shown in FIG. 5, the apparatus includes:

an obtaining module 510, configure for obtaining input data of a network layer in a convolutional neural work;

a division module 520, configured for dividing the input data in a depth direction to obtain a plurality of slices;

an extraction module 530, configured for, for each slice, extracting each time data points from depth levels of the slice according to the preset step size, to obtain the plurality of data points;

a mapping module 540, configured for mapping the plurality of data points extracted each time from each slice to the same position at different depth levels in the three-dimensional data to respectively obtain to-be-merged data corresponding to each slice, and arranging a plurality of to-be-merged data in the depth direction to obtain the rearranged data; and an operation module 550, configured for performing convolution operation on the rearranged data with a convolution kernel of a preset size to obtain a convolution result.

In the present embodiment, the input data is divided in the depth direction into a plurality of slices; data points are extracted each time from each slice according to a preset step size; data points extracted are mapped to the same position at different depth levels in the three-dimensional data and are then arranged by merging. A convolution kernel of a preset size is used to perform convolution operation on the rearranged data to obtain a convolution result. After dividing the input data, the extraction of a plurality of data points from each slice may be performed in parallel, which can increase the operation speed. In addition, since a plurality of data points are extracted from each slice and mapped, each slice is expanded in the depth direction, and the size at each depth level is reduced, and thus a smaller convolution kernel can be used to perform convolution operation on the input data. Through this method, the input data of each network layer is processed in such a manner that convolution operation can be performed on all the rearranged data with the same convolution kernel of a preset size. Therefore, the overhead of hardware resources can be reduced, and for each network layer, the same convolution kernel of a smaller size is used to perform convolution operation, which can improve the operation efficiency of the convolutional neural network.

In addition, corresponding to the method for convolution operation according to the above embodiment, an embodiment of the present application provides a computer readable storage medium having executable codes stored thereon which, when executed, perform the method for convolution operation according to the embodiments of the present application. Specifically, the method for convolution operation may include:

obtaining input data of a network layer in a convolutional neural work;

extracting each time a plurality of data points from the input data according to a preset step size;

mapping the plurality of data points extracted each time to the same position at different depth levels of three-dimensional data to obtain rearranged data; and performing convolution operation on the rearranged data with a convolution kernel of a preset size to obtain a convolution result.

In the present embodiment, a computer readable storage medium has executable codes stored thereon which, when executed, perform the method for convolution operation according to embodiments of the present application. In the method, a plurality of data points are extracted each time from obtained input data of a network layer in a convolutional neural network according to a preset step size; the plurality of data points extracted each time are mapped to the same position at different depth levels in three-dimensional data to obtain rearranged data; and a convolution kernel of a preset size is used to perform convolution operation on the rearranged data to obtain a convolution result. Since a plurality of data points are extracted from the input data of the network layer and mapped, the input data is expanded in the depth direction, and the size at each depth level is reduced. As the size of the input data decreases, a smaller convolution kernel can be used to perform convolution operation on the input data. Through this method, the input data of each network layer is processed in such a way that convolution operation can be performed on all the obtained rearranged data by using the same convolution kernel of a preset size. Therefore, the overhead of hardware resources can be reduced. Moreover, the same convolution kernel of a smaller size is used to perform convolution operation on all the network layers. Operation efficiency of the convolutional neural network is thus improved.

In addition, corresponding to the method for convolution operation according to the above embodiment, an embodiment of the present application provides an application program which, when executed, performs the method for convolution operation according to embodiments of the present application. Specifically, the method for convolution operation according to embodiments of the present application may include:

obtaining input data of a network layer in a convolutional neural work;

extracting each time a plurality of data points from the input data according to a preset step size;

mapping the plurality of data points extracted each time to the same position at different depth levels of three-dimensional data to obtain rearranged data; and performing convolution operation on the rearranged data with a convolution kernel of a preset size to obtain a convolution result.

In the present embodiment, an application program performs, when being executed, the method for convolution operation according to embodiments of the present application. In the method, a plurality of data points are extracted each time from obtained input data of a network layer in a convolutional neural network according to a preset step size; the plurality of data points extracted each time are mapped to the same position at different depth levels in three-dimensional data to obtain rearranged data; and a convolution kernel of a preset size is used to perform convolution operation on the rearranged data to obtain a convolution result. Since a plurality of data points are extracted from the input data of the network layer and mapped, the input data is expanded in the depth direction, and the size at each depth level is reduced. As the size of the input data decreases, a smaller convolution kernel can be used to perform convolution operation on the input data. Through this method, the input data of each network layer is processed in such a way that convolution operation can be performed on all the obtained rearranged data by using the same convolution kernel of a preset size. Therefore, the overhead of hardware resources can be reduced. Moreover, the same convolution kernel of a smaller size is used to perform convolution operation on all the network layers. Operation efficiency of the convolutional neural network is thus improved.

Figure 6:
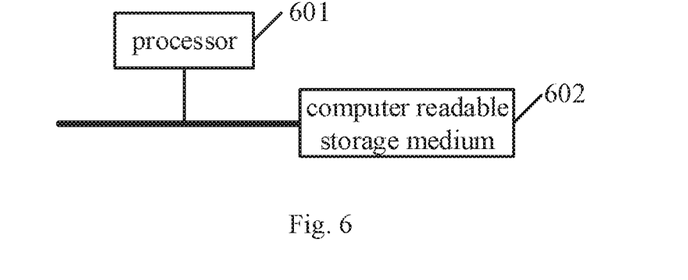
FIG. 6 is a schematic structural diagram of a computer device according to an embodiment of the present application.

In addition, corresponding to the method for convolution operation according to the above embodiment, an embodiment of the present application provides a computer device which, as shown in FIG. 6, includes a processor 601 and a computer readable storage medium 602.

The computer readable storage medium 602 is configured for storing executable codes.

The processor 601 is configured for performing, when executing the executable code stored in the computer readable storage medium 602, the following steps:

obtaining input data of a network layer in a convolutional neural work;

extracting each time a plurality of data points from the input data according to a preset step size;

mapping the plurality of data points extracted each time to the same position at different depth levels of three-dimensional data to obtain rearranged data; and performing convolution operation on the rearranged data with a convolution kernel of a preset size to obtain a convolution result.

Optionally, the processor 601 may be further configured for:

dividing the input data in a depth direction to obtain a plurality of slices.

When extracting each time a plurality of data points from the input data according to a preset step size, the processor 601 is specifically configured for:

for each slice, extracting each time data points from depth levels of the slice according to the preset step size, to obtain the plurality of data points.

When mapping the plurality of data points extracted each time to the same position at different depth levels in three-dimensional data to obtain rearranged data, the processor 601 is specifically configured for:

mapping the plurality of data points extracted each time from each slice to the same position at different depth levels in the three-dimensional data to respectively obtain to-be-merged data corresponding to each slice; and arranging a plurality of to-be-merged data in the depth direction to obtain the rearranged data.

Optionally, when extracting each time a plurality of data points from the input data according to a preset step size, the processor 601 is specifically configured for:

extracting each time, from each depth level of the input data, a plurality of data points according to the preset step size respectively.

When mapping the plurality of data points extracted each time to the same position at different depth levels in three-dimensional data to obtain rearranged data, the processor 601 is specifically configured for:

mapping the plurality of data points extracted each time from depth levels of the input data to the same position at different depth levels in the three-dimensional data to obtain a plurality of data to be merged; and arranging a plurality of to-be-merged data in the depth direction to obtain the rearranged data.

Optionally, when mapping the plurality of data points extracted each time to the same position at different depth levels of three-dimensional data to obtain rearranged data, the processor 601 is specifically configured for:

arranging the plurality of data points extracted each time; and storing the plurality of data points extracted each time, in an order as they are arranged, to the same position at different depth levels in the three-dimensional data to obtain the rearranged data.

Data can be transmitted between the computer readable storage medium 602 and the processor 601 through a wired connection or a wireless connection, and the computer device can communicate with other devices through a wired communication interface or a wireless communication interface.

The above computer readable storage medium may include an RAM (Random Access Memory), and may also include an NVM (Non-volatile memory), such as at least one disk memory. Optionally, the computer readable storage medium may also be at least one storage device located away from the processor.

The above processor may be a general purpose processor, for example, a Central Processing Unit (CPU), an Network Processor (NP). The processor may also be a Digital Signal Processor (DSP), an Application Specific Integrated Circuit (ASIC), a Field-Programmable Gate Array (FPGA) or other programmable logic devices. The processor may also include discrete gates, transistor logic devices, or discrete hardware components.

In the present embodiment, the processor of the computing device reads the executable codes stored in the computer readable storage medium so as to execute an application program corresponding to the codes. The application program, when executed, performs the method for convolution operation according to embodiments of the present application. In the method, a plurality of data points are extracted each time from obtained input data of a network layer in a convolutional neural network according to a preset step size; the plurality of data points extracted each time are mapped to the same position at different depth levels in three-dimensional data to obtain rearranged data; and a convolution kernel of a preset size is used to perform convolution operation on the rearranged data to obtain a convolution result. Since a plurality of data points are extracted from the input data of the network layer and mapped, the input data is expanded in the depth direction, and the size at each depth level is reduced. As the size of the input data decreases, a smaller convolution kernel can be used to perform convolution operation on the input data. Through this method, the input data of each network layer is processed in such a way that convolution operation can be performed on all the obtained rearranged data by using the same convolution kernel of a preset size. Therefore, the overhead of hardware resources can be reduced. Moreover, the same convolution kernel of a smaller size is used to perform convolution operation on all the network layers. Operation efficiency of the convolutional neural network is thus improved.

The embodiments of the computer device, application program and computer readable storage medium are described briefly since they are substantially similar to the above method embodiment. Details of these embodiments can be known with reference to the description of the method embodiment.

It should be noted that the relationship terms used herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, the embodiment of the system is described briefly since it is substantially similar to the method embodiment, and the related parts can be referred to the corresponding description of the method embodiment.

The embodiments described above are simply preferable embodiments of the present application, and are not intended to limit the present application. Any modifications, alternatives, improvements, or the like within the spirit and principle of the present application shall be included within the scope of protection of the present application.

What is claimed is:

1. A method for convolution operation, performed by a computer device having a convolution kernel of a preset size, comprising:
    obtaining input data of a network layer in a convolutional neural work, wherein the input data is three-dimensional data having a size represented as W×H×I, wherein I is a depth of the input data, and W×H is a data size at each depth level, wherein a size of a convolution kernel for the input data is larger than the preset size;
    extracting each time a plurality of data points from the input data according to a preset step size;
    mapping the plurality of data points extracted each time to the same position at different depth levels of three-dimensional data to obtain rearranged data such that a size of the input data at each depth level is reduced without changing original volume of the input data, wherein a depth of the rearranged data is larger than a depth of the input data, and a data size of the rearranged data at each depth level is smaller than the data size of the input data at each depth level; the data size of the rearranged data at each depth allows that convolution operation can be performed on the rearranged data by using the convolution kernel of the preset size; and
    performing convolution operation on the rearranged data with the convolution kernel of the preset size to obtain a convolution result.

2. The method of claim 1, wherein, before extracting each time a plurality of data points from the input data according to a preset step size, the method further comprises:
    dividing the input data in a depth direction to obtain a plurality of slices;
    the operation of extracting each time a plurality of data points from the input data according to a preset step size comprises:
        for each slice, extracting each time data points from depth levels of the slice according to the preset step size, to obtain the plurality of data points;
    the operation of mapping the plurality of data points extracted each time to the same position at different depth levels in three-dimensional data to obtain rearranged data comprises:
        mapping the plurality of data points extracted each time from each slice to the same position at different depth levels in the three-dimensional data to respectively obtain to-be-merged data corresponding to each slice; and
        arranging a plurality of to-be-merged data in the depth direction to obtain the rearranged data.

3. The method of claim 1, wherein extracting each time a plurality of data points from the input data according to a preset step size comprises:
    extracting each time, from each depth level of the input data, a plurality of data points according to the preset step size respectively;
    the operation of mapping the plurality of data points extracted each time to the same position at different depth levels in three-dimensional data to obtain rearranged data comprises:
        mapping the plurality of data points extracted each time from depth levels of the input data to the same position at different depth levels in the three-dimensional data to obtain a plurality of data to be merged; and
        arranging a plurality of to-be-merged data in the depth direction to obtain the rearranged data.

4. The method of claim 1, wherein, mapping the plurality of data points extracted each time to the same position at different depth levels of three-dimensional data to obtain rearranged data comprises:
    arranging the plurality of data points extracted each time; and
    storing the plurality of data points extracted each time, in an order as they are arranged, to the same position at different depth levels in the three-dimensional data to obtain the rearranged data.

5. An apparatus for convolution operation, the apparatus having a convolution kernel of a preset size, comprising:
    an obtaining module, configure for obtaining input data of a network layer in a convolutional neural work, wherein the input data is three-dimensional data having a size represented as W×H×I, wherein I is a depth of the input data, and W×H is a data size at each depth level, wherein a size of a convolution kernel for the input data is larger than the preset size;

an extraction module, configured for extracting each time a plurality of data points from the input data according to a preset step size;

a mapping module, configured for mapping the plurality of data points extracted each time to the same position at different depth levels of three-dimensional data to obtain rearranged data such that a size of the input data at each depth level is reduced without changing original volume of the input data, wherein a depth of the rearranged data is larger than a depth of the input data, and a data size of the rearranged data at each depth level is smaller than the data size of the input data at each depth level; the data size of the rearranged data at each depth allows that convolution operation can be performed on the rearranged data by using the convolution kernel of the preset size; and an operation module, configured for performing convolution operation on the rearranged data with the convolution kernel of the preset size to obtain a convolution result.

6. The apparatus of claim 5, further comprising:

a division module, configured for dividing the input data in a depth direction to obtain a plurality of slices;

the extraction module is further configured for:

for each slice, extracting each time data points from depth levels of the slice according to the preset step size, to obtain the plurality of data points;

the mapping module is further configured for:

mapping the plurality of data points extracted each time from each slice to the same position at different depth levels in the three-dimensional data to respectively obtain to-be-merged data corresponding to each slice; and arranging a plurality of to-be-merged data in the depth direction to obtain the rearranged data.

7. The apparatus of claim 5, wherein the extraction module is further configured for:

extracting each time, from each depth level of the input data, a plurality of data points according to the preset step size respectively;

the mapping module is further configured for:

mapping the plurality of data points extracted each time from depth levels of the input data to the same position at different depth levels in the three-dimensional data to obtain a plurality of data to be merged; and arranging a plurality of to-be-merged data in the depth direction to obtain the rearranged data.

8. The apparatus of claim 5, wherein the extraction module is further configured for:

arranging the plurality of data points extracted each time; and storing the plurality of data points extracted each time, in an order as they are arranged, to the same position at different depth levels in the three-dimensional data to obtain the rearranged data.

9. A non-transitory computer readable storage medium having executable codes stored thereon which, when executed, performs the method for convolution operation of claim 1.

10. A computer device, comprising:

a non-transitory computer readable storage medium configured for storing executable codes; and a processor configured for executing the executable code stored in the computer readable storage medium to perform the method for convolution operation of claim 1.

* * * * *